US010443952B2

(12) United States Patent
Pourima

(10) Patent No.: US 10,443,952 B2
(45) Date of Patent: Oct. 15, 2019

(54) COMPRESSED GAS ENERGY STORAGE AND HARVESTING SYSTEM AND METHOD WITH STORAGE OF THE HEAT BY MEANS OF A RADIAL EXCHANGER

(71) Applicant: IFP Energies nouvelles, Rueil-Malmaison (FR)

(72) Inventor: Christophe Pourima, Macon (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 358 days.

(21) Appl. No.: 15/323,370

(22) PCT Filed: Jun. 22, 2015

(86) PCT No.: PCT/EP2015/063998
§ 371 (c)(1),
(2) Date: Dec. 30, 2016

(87) PCT Pub. No.: WO2016/001000
PCT Pub. Date: Jan. 7, 2016

(65) Prior Publication Data
US 2017/0160019 A1 Jun. 8, 2017

(30) Foreign Application Priority Data

Jul. 3, 2014 (FR) .................................. 14 56349

(51) Int. Cl.
*F01K 13/00* (2006.01)
*F28D 20/00* (2006.01)
(Continued)

(52) U.S. Cl.
CPC ............. *F28D 20/00* (2013.01); *F01D 15/10* (2013.01); *F02C 6/16* (2013.01); *F28D 20/0034* (2013.01);
(Continued)

(58) Field of Classification Search
CPC ...... F02C 6/16; F28D 20/023; F28D 20/0056; F28D 20/0034; F28D 20/00
(Continued)

(56) References Cited

U.S. PATENT DOCUMENTS

2010/0251712 A1* 10/2010 Nakhamkin .............. F01K 3/12
60/659
2011/0094231 A1 4/2011 Freund
(Continued)

FOREIGN PATENT DOCUMENTS

EP 2447501 A2 5/2012
FR 3014182 A1 6/2015
(Continued)

OTHER PUBLICATIONS

International Search Report for PCT/EP2015/063998 dated Sep. 29, 2015; English translation submitted herewith (7 pages).

*Primary Examiner* — Jason D Shanske
(74) *Attorney, Agent, or Firm* — Fitch, Even, Tabin & Flannery L.L.P.

(57) ABSTRACT

The present invention relates to an AACAES system and method in which balls make it possible to store heat. The heat exchanges are produced by means of at least one radial heat exchanger, in which the balls and a first fluid circulate, the first fluid passing radially through means for circulating the balls.

20 Claims, 4 Drawing Sheets

(51) Int. Cl.
    *F02C 6/16*     (2006.01)
    *F28D 20/02*    (2006.01)
    *F01D 15/10*    (2006.01)

(52) U.S. Cl.
    CPC ....... *F28D 20/0056* (2013.01); *F28D 20/023* (2013.01); *F05D 2210/12* (2013.01); *F05D 2260/42* (2013.01); *F28D 2020/0047* (2013.01); *F28D 2020/0078* (2013.01); *F28D 2020/0082* (2013.01); *Y02E 60/145* (2013.01); *Y02E 60/15* (2013.01)

(58) Field of Classification Search
    USPC .......................................................... 60/645
    See application file for complete search history.

(56) References Cited

U.S. PATENT DOCUMENTS

| | | | |
|---|---|---|---|
| 2012/0096845 A1* | 4/2012 | Ingersoll | F04B 41/02 60/408 |
| 2012/0297772 A1* | 11/2012 | McBride | F01B 23/00 60/649 |
| 2014/0033714 A1 | 2/2014 | Gonzalez | |
| 2014/0318731 A1* | 10/2014 | Mucciardi | F28D 20/02 165/10 |

FOREIGN PATENT DOCUMENTS

| | | | |
|---|---|---|---|
| WO | 2011/104556 A2 | 9/2011 | |
| WO | 2013/097031 A2 | 7/2013 | |

\* cited by examiner

COMPRESSED GAS ENERGY STORAGE AND HARVESTING SYSTEM AND METHOD WITH STORAGE OF THE HEAT BY MEANS OF A RADIAL EXCHANGER

CROSS-REFERENCE TO RELATED APPLICATIONS

This application is a U.S. national phase application filed under 35 U.S.C. § 371 of International Application No. PCT/EP2015/063998, filed Jun. 22, 2015, designating the United States, which claims priority from French Patent Application No. 14/56.349, filed Jul. 3, 2014, which are hereby incorporated herein by reference in their entirety for all purposes.

The field of the present invention relates to compressed air energy storage (CAES). In particular, the present invention relates to an AACAES (Advanced Adiabatic Compressed Air Energy Storage) system which provides for the storage of the air and the storage of the heat generated.

In a compressed air energy storage (CAES) system, the energy, that is to be used at another time, is stored in compressed air form. For the storage, an energy, notably electrical, drives air compressors, and for the withdrawal, the compressed air drives turbines, which can be linked to an electrical generator. The efficiency of this solution is not optimal because a portion of the energy from the compressed air is in the form of heat which is not used. In effect, in the CAES methods, only the mechanical energy of the air is used, that is to say that all the heat produced in the compression is discarded. Furthermore, the efficiency of a CAES system is not optimal, because the system requires the stored air to be heated to produce the expansion of the air. In effect, by way of example, if the air is stored at 8 MPa (80 bar) and at ambient temperature and if the energy is to be harvested by an expansion, the decompression of the air will once again follow an isentropic curve, but this time from initial storage conditions (approximately 8 MPa and 300 K). the air is therefore cooled to unrealistic temperatures (83 K or −191° C.). It is therefore necessary to reheat it, which can be done using a gas burner, or other fuel.

Several variants to this system currently exist. The following systems and methods can notably be cited:
  ACAES (Adiabatic Compressed Air Energy Storage) in which the air is stored at the temperature due to the compression. However, this type of system requires a bulky and expensive specific storage system.
  AACAES (Advanced Adiabatic Compressed Air Energy Storage) in which the air is stored at ambient temperature and the heat due to the compression is also stored in a heat storage system TES (Thermal Energy Storage). The heat stored in the TES is used to heat the air before its expansion.
  Refinements of the AACAES systems have related to the construction of the heat storage system TES by means of a fixed tank of heat storage material. For example, the patent application filed under the number FR 13/61835 describes an AACAES system in which the heat storage system is produced by a tank containing heat storage materials at different temperature levels. However, for these static heat storage systems TES (static in as much as there is no movement of the heat storage materials), it is necessary to manage the thermal gradient between two cycles, which makes the system complex.

Another solution envisaged for the heat storage system TES is the use of a heat transfer fluid making it possible to store the heat deriving from the compression to restore it to the air before the expansion by means of heat exchangers. For example, the patent application EP 2447501 describes an AACAES system in which oil, used as heat transfer fluid, circulates in a closed circuit to exchange heat with the air. Moreover, the patent applications EP 2530283 and WO 2011053411 describe an AACAES system, in which the heat exchanges are produced by a heat transfer fluid circulating in a closed circuit, the closed circuit comprising a single tank of heat transfer fluid.

However, the systems described in these patent applications require significant storage volumes because of the heat transfer fluid used, and/or because the heat transfer fluid is stored in a single tank and/or because of the arrangement of the heat transfer fluid circulation circuits. Furthermore, for these systems, significant heat losses are generated by the heat exchangers used.

To mitigate these drawbacks, the present invention relates to an AACAES system and method in which the storage of heat is implemented by a heat transfer fluid and in which the heat exchange between the compressed gas and the heat transfer fluid is produced by means of a radial heat exchanger. Such a radial exchanger makes it possible to limit the heat losses. Furthermore, according to an embodiment of the invention, the heat transfer fluid includes heat storage balls to reduce the heat storage volume, by virtue of the high storage capacity of such balls.

The System and Method According to the Invention

The invention relates to a compressed gas energy storage and harvesting system comprising at least one gas compression means, storage means for said compressed gas, at least one expansion means for said compressed gas, heat exchange means between said compressed gas and heat storage balls, storage means for said heat storage balls, said heat exchange means being arranged at the output of said gas compression means and/or at the input of said gas expansion means. Said heat exchange means comprise at least one radial exchanger, in which a first fluid and said heat storage balls circulate to exchange heat, said first fluid circulating within said radial exchanger by passing radially through means for circulating said heat storage balls.

Advantageously, said radial exchanger comprises an annular space in which said heat storage balls circulate from top to bottom, said first fluid circulating from outside said annular space, through said annular space, to the interior of said annular space.

According to an aspect of the invention, said first fluid and said balls circulate in counterflow in said radial exchanger.

According to a variant embodiment of the invention, said first fluid is said compressed gas.

Alternatively, said first fluid is a secondary fluid exchanging heat with said compressed gas.

Preferably, said system comprises at least two storage means for said heat storage balls, said heat storage balls circulating from a first storage means to a second storage means through at least one radial exchanger.

According to a feature of the invention, said energy storage and harvesting system comprises several staged gas compression means, several staged expansion means and a heat exchange means arranged between each stage of said compression means and/or of said expansion means.

Advantageously, said heat exchange means comprise several radial exchangers mounted in series and/or in parallel.

According to an embodiment of the invention, said heat storage balls are incorporated in a heat transfer fluid.

Preferably, said heat storage balls have a diameter of between 10 nm and 50 mm.

Advantageously, said heat storage balls are produced in alumina, in metal or by micro or nano capsules of phase change material, such as paraffins, metals or salts.

Furthermore, said balls can withstand temperatures of between 20 and 700° C.

Furthermore, the invention relates to a compressed gas energy storage and harvesting method, in which the following steps are carried out:

a) a gas is compressed;
b) said compressed gas is cooled by heat exchange with heat storage balls;
c) said cooled compressed gas is stored;
d) said stored compressed gas is heated by heat exchange with said heat storage balls; and
e) said heated compressed gas is expanded to generate an energy, and in which said heat storage balls are stored. For this method, the heat is exchanged between said gas and said heat storage balls by means of at least one radial exchanger, in which said heat storage balls and a first fluid are made to circulate, said first fluid circulating within said radial exchanger by passing radially through means for circulating said heat storage balls.

According to a variant embodiment of the invention, the heat is exchanged between said gas and said heat storage balls by making said gas circulate in said radial exchanger as first fluid.

Alternatively, the heat is exchanged between said gas and said heat storage balls by exchanging the heat between said gas and a secondary fluid, then by exchanging the heat between said secondary fluid and said heat storage balls by means of said radial exchanger, said secondary fluid being the first fluid.

According to an aspect of the invention, said heat storage balls are made to circulate between two storage means for at least one heat exchange.

According to an embodiment of the invention, said heat storage balls are incorporated in a heat transfer fluid.

Advantageously, said heat storage balls have a diameter of between 10 nm and 50 mm.

Preferably, said balls are produced in aluminas, in metals or by micro or nano capsules of phase change material, such as paraffins, metals or salts.

Furthermore, said balls can withstand temperatures of between 20 and 700° C.

BRIEF DESCRIPTION OF THE FIGURES

Other features and advantages of the method according to the invention will become apparent on reading the following description of nonlimiting exemplary embodiments, by referring to the figures attached and described hereinbelow.

DETAILED DESCRIPTION OF THE INVENTION

Figure 1:
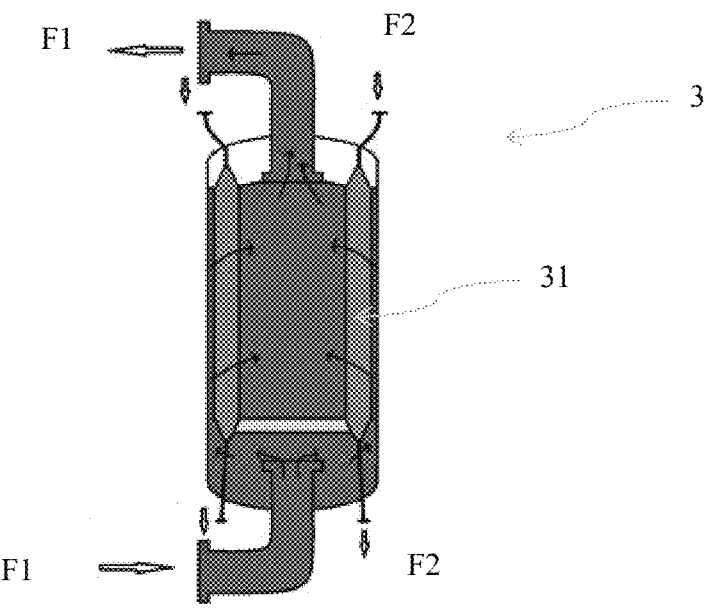
FIG. 1 illustrates a radial exchanger.

The present invention relates to a compressed gas energy storage and harvesting system equipped with a heat storage means (AACAES). The system according to the invention comprises:

at least one gas compression means (or compressor), preferably the system comprises several staged gas compression means, the gas compression means can be driven by a motor, notably an electric motor, at least one means for storing gas compressed by the gas compression means, the compressed gas storage means can be a tank, an underground cavity or equivalent, etc.

at least one gas expansion means (or expansion valve) making it possible to expand the compressed and stored gas, the system preferably comprises several staged gas expansion means, the gas expansion means makes it possible to generate an energy, notably an electrical energy by means of a generator, heat exchange means, between the compressed gas and heat storage balls (that can be incorporated in a heat transfer fluid) for cooling the compressed gas at the output of the gas compression means and/or for heating the compressed gas at the input of the gas expansion means, the heat exchange means comprising at least one radial exchanger, the heat exchanges between the gas and the heat storage balls can be direct or indirect (with or without intermediate fluid), storage means for the heat storage balls (TES), circuits for circulation of the heat storage balls between the storage means for the heat storage balls by passing through at least one radial heat exchanger.

The terms "staged compression or expansion means" are used when a plurality of compression or expansion means are mounted in succession one after the other in series: the compressed or expanded gas at the output of the first compression or expansion means then passes into a second compression or expansion means, and so on. A compression or expansion means of the plurality of staged compression or expansion means is then called a compression or expansion stage. Advantageously, when the system comprises a plurality of compression and/or expansion stages, a heat exchange means is arranged between each compression and/or expansion stage. Thus, the compressed air is cooled between each compression, which makes it possible to optimize the efficiency of the next compression, and the expanded air is heated between each expansion, which makes it possible to optimize the efficiency of the next expansion. The number of compression stages and the number of expansion stages can be between 2 and 10, preferably between 3 and 5. Preferably, the number of compression stages is identical to the number of expansion stages. Alternatively, the AACAES system according to the invention can contain a single compression means and a single expansion means.

The system according to the invention is suited to any type of gas, notably air. In this case, the air at the input used for the compression can be taken from the ambient air and the air at the output after the expansion can be released into the ambient air. Hereinafter in the description, only the variant embodiment with compressed air will be described, but the system and the method are valid for any other gas.

The heat exchange means make it possible, in the storage of the compressed gas (compression), to recover a maximum of heat deriving from the compression of the gas at the output of the compressors and to reduce the temperature of the gas before the transition to the next compression or before the storage. For example, the compressed gas can switch from a temperature higher than 150° C. for example approximately 190° C., to a temperature lower than 80° C., for example approximately 50° C. The heat exchange means make it possible, in the restoration of the energy, to restore a maximum of stored heat by increasing the temperature of the gas before the transition to the next expansion. For example, the gas can switch from a temperature lower than 80° C., for example approximately 50° C., to a temperature higher than 150° C., for example approximately 180° C.

According to the invention, the heat exchange means comprise at least one radial exchanger for the direct or indirect exchange of heat between the gas and the heat storage balls. In a radial heat exchanger, a fluid and heat storage balls (or two fluids), circulate in counterflow or coflow. In a radial exchanger arranged vertically, a first fluid circulates from bottom to top of the exchanger and the balls (or the second fluid) circulate from top to bottom. Furthermore, the first fluid has a radial motion. According to an exemplary embodiment, the first fluid passes radially through the space for circulation of the balls (or of the second fluid), from the periphery of the radial exchanger to the center of the radial exchanger. According to a second exemplary embodiment, the first fluid passes radially through the space for circulation of the balls (or of the second fluid), from the center of the radial exchanger to the periphery of the radial exchanger. It is in the passage of the first fluid in the space of circulation of the balls (or of the second fluid) that the heat exchange is produced.

According to an embodiment of the invention, the space for circulation of the balls (or of the second fluid) can be an annular space, that is to say of substantially tubular form. The geometry of the radial exchanger makes it possible to have flow velocities through the balls (or the second fluid) lower than a conventional fixed bed and therefore makes it possible to reduce the head losses, which makes it possible to increase the efficiency of the heat exchange and, even more so, the performance levels of the AACAES system. It is specified that the terms "first" and "second" are used here without implying any notion of order, of quantity or of importance, but these terms are used to distinguish one element from another.

According to a second embodiment of the invention, the space for circulation of the balls can consist of several vertical tubes arranged around the axis of the exchanger so as to contain the fluid and have a large exchange surface.

Preferably, the second fluid corresponds to the balls. When the exchange of heat between the gas and the balls is direct, the first fluid corresponds to the gas. When the exchange of heat between the gas and the balls is indirect, that is to say for an exchange of heat between the gas and the balls by means of at least one intermediate fluid, the radial exchanger allows for an exchange of heat between the intermediate fluid and the balls, the first fluid then corresponds to the intermediate fluid.

FIG. 1 is a nonlimiting example of a radial exchanger according to a nonlimiting exemplary embodiment of the invention. The radial exchanger 3 is arranged vertically and comprises an annular space 31, of tubular form, situated between the periphery and the center of the radial exchanger 3. The balls (or second fluid) F2 circulate in the annular space by gravity from top to bottom. As illustrated, the radial exchanger 3 can comprise two inputs and two outputs for the balls (or second fluid) F2. The bottom part of the radial exchanger 3 comprises an input for the first fluid F1, and the top part of the radial exchanger 3 comprises an output for the first fluid F1. Within the radial exchanger 3, the first fluid F1 is directed toward the periphery of the radial exchanger 3, then circulates radially form the periphery to the center of the radial exchanger 3 by passing through the annular space 31.

The radial exchanger is particularly suited to the use of balls alone without heat transfer fluid for which the displacement in the radial exchanger is done by gravity and the displacement between the drums and the exchanger is done by pneumatic means (use of air). In this case, the interface formed by the annular space 31 for circulation of the balls between the compressed air and the balls is a grating of annular form which keeps the displacement of the balls toward the center of the exchanger.

According to a variant embodiment, the space for circulation of the balls is not of tubular form, but parallelepipedal or of any other similar form.

If the fluid F2 is a heat transfer fluid in which balls are incorporated, the space for circulation of the balls 31 can consist of several vertical tubes arranged around the axis of the exchanger so as to contain the fluid and have a large exchange surface.

Figure 2:
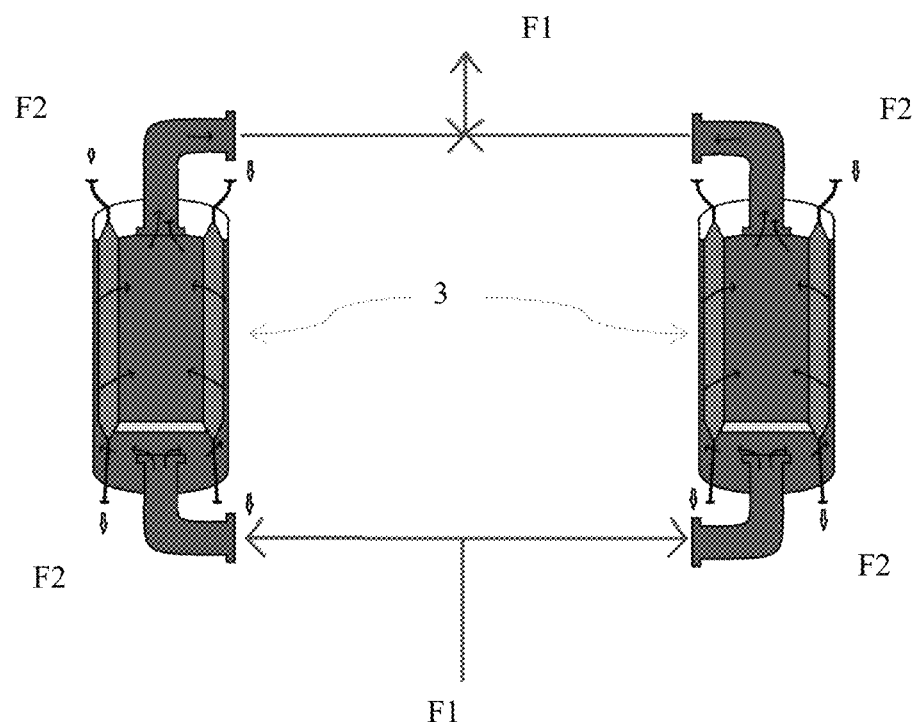
FIG. 2 illustrates a parallel mounting of two radial exchangers.

According to a variant embodiment, the heat exchange means comprise several radial exchangers in parallel, notably for the case in which the flow rate of air to be heated or to be cooled is significant. FIG. 2 illustrates a configuration of two radial exchangers 3 mounted in parallel. The flow of the first fluid F1 is split into two, so as to divide the flow rate, each portion of the flow of the first fluid F1 circulates in a radial exchanger 3, in accordance with what was described in relation to FIG. 1. The flows of the first fluid at the output of the radial exchangers are mixed. The balls (or second fluid) F2 circulate separately in the two radial exchangers 3.

Figure 3:
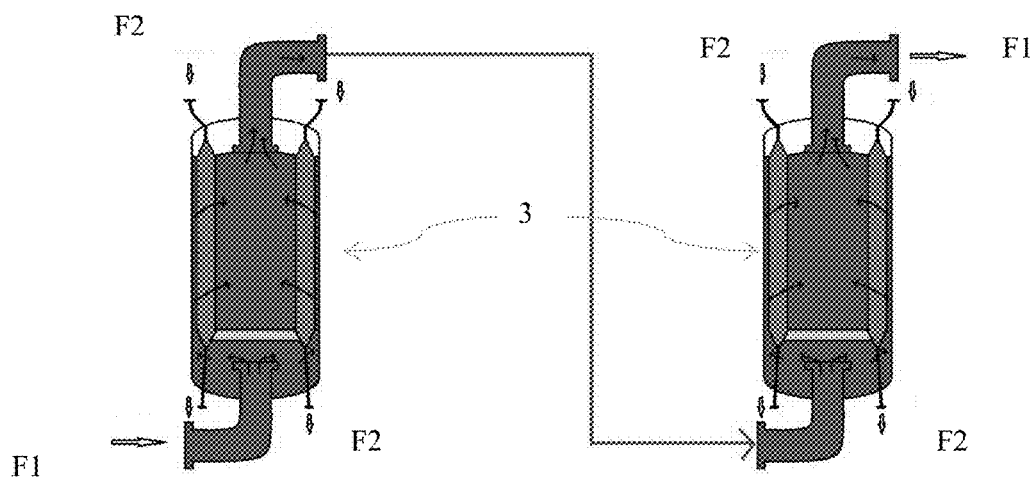
FIG. 3 illustrates a series mounting of two radial exchangers.

According to another variant embodiment, the heat exchange means comprise several radial exchangers cascaded (in series), in order for the output temperature of the balls (or the fluid) F2 to be as close as possible to the input temperature of the air or of the fluid F1. FIG. 3 illustrates a configuration of two radial exchangers 3 mounted in series. The first fluid F1 circulates within the first radial exchanger 3, then within the second radial exchanger 3, the output of the first radial exchanger 3 being linked to the input of the second radial exchanger 3. The circulation of the first fluid F1 in each radial exchanger is identical to what was described in relation to FIG. 1. The balls (or the second fluid F2) circulate separately in the two radial exchangers 3.

In order to combine the advantages of these two variants, a configuration with radial exchangers in series and in parallel can be envisaged.

Advantageously, the heat storage balls circulate between two storage means for the balls and pass through at least one radial exchanger. Thus, the storage means for the balls comprise at least one tank for storing hot balls, called hot drum and a tank for cold balls, called cold drum. The hot drum stores the heat deriving from the heat exchanges in the compression and the cold drum stores the heat transfer fluid cooled in the expansion. For the cooling of the compressed air (storage of energy), the balls circulate from the cold drum, pass through at least one radial exchanger, then are stored in the hot drum. For the reheating of the air (restoration of the energy), the balls circulate from the hot drum, pass through at least one radial exchanger, then are stored in the cold drum. According to the invention, the hot and cold drums have no direct link; to pass from one to the other, the balls systematically pass through a radial exchanger.

This arrangement of the storage means for the balls with a cold drum and a hot drum allows for a separate storage of the cold heat transfer fluid and of the hot heat transfer fluid, which allows for an effective storage of the heat energy with a minimum of losses.

The heat storage balls are elements of small dimensions capable of storing up and restoring heat. The heat storage balls have a high heat capacity and more specifically a high energy density (or storage capacity) expressed in $MJ/m^3$. The balls can be substantially spherical and have a diameter of a few tens of nanometers to a few tens of millimeters depending on the nature thereof, preferably, the diameter of the balls is between 10 nm and 50 mm, in particular between 50 µm and 10 mm. The balls according to the invention are produced in materials that can be used in temperature ranges of between 20° C. and 700° C. The balls used can be produced by aluminas, or in metal or by phase change materials (PCM) encapsulated or non-encapsulated within the operating temperature range. The nature of the phase change materials PCM can be of different types, including:

salts (with a storage capacity of between 300 to 1000 $MJ/m^3$): for example NaCl, $NaNO_3$, $KNO_3$, etc.,
metals (with a storage capacity of between 100 and 2000 $MJ/m^3$): for example magnesium, aluminum, copper, antimony, etc.

The heat storage balls make it possible to store up a higher quantity of heat than a heat transfer fluid alone, so the necessary volume of heat storage balls is less than volume necessary for a conventional heat transfer fluid. Thus, it is possible to reduce the storage volumes of the TES.

The choice of the nature of the balls depends on the temperature range in which they are used, which is directly linked to the configuration of the compression (number of stages and compression rate) and storage pressure of the compressed air of the TES. Upon the storage of the compressed air, the balls can be transferred from a cold storage drum to a hot storage drum via a pump, notably a pneumatic pump. The pump can also be used to place the balls in suspension in the drums. In the energy restoration phase, the balls can be transferred from the hot storage drum to the cold storage drum via a pump. The pump can be the same as that used in the storage of the compressed air.

According to a variant embodiment of the invention, the heat storage balls are incorporated in a heat transfer fluid. The heat transfer fluid can be of different natures: molten salts (for example $NaNO_2$, $NaNO_3$, $KNO_2$, etc.), oil, air, water, etc., so that it is easy to implement from a heat exchange and hydraulic point of view according to the type of balls used and the type of exchanger installed.

According to a first embodiment of the invention, the exchange of heat between the air and the balls or the heat transfer fluid comprising the balls is direct: the air exchanges the heat directly with the balls or heat transfer fluid comprising the balls without intermediate fluid. Thus, between each compression stage and/or expansion stage, a radial exchanger is inserted that allows for a transfer of heat between the air and the balls. The balls circulate between two drums by passing through all the radial exchangers. The flow of balls is divided into parallel branches. Each parallel branch comprises a single radial exchanger. The direction of circulation of the balls is the same in all the branches. This embodiment makes it possible to limit the number of ball storage drums to two.

Figure 4:
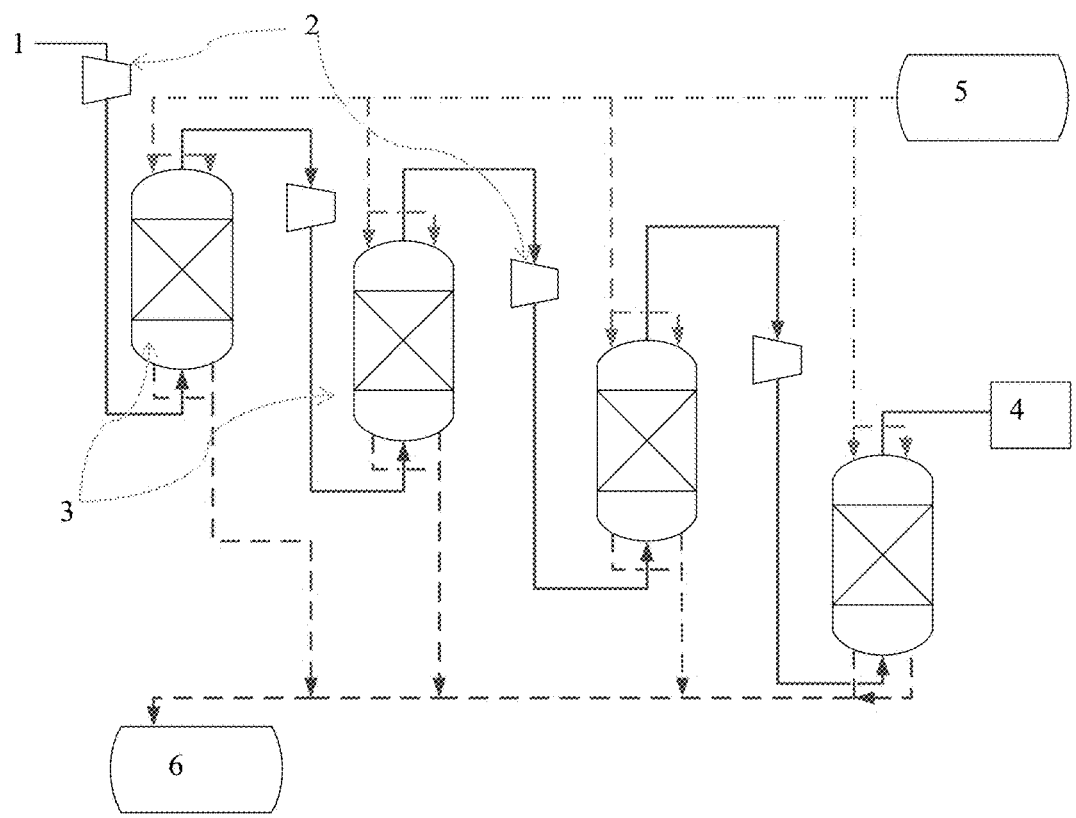
FIG. 4 illustrates a compressed gas energy storage and harvesting system, according to a first embodiment of the invention, in energy storage operating mode.

FIG. 4 represents an AACAES system according to a nonlimiting example of the first embodiment of the invention, for energy storage operation (i.e. by air compression). As illustrated, the AACAES system according to the invention comprises four compression stages produced by air compressors 2 which successively compress the air taken from the ambient air 1. Between each compression stage, there is a radial heat exchanger 3, with in which air compressed and heated (by compression) is cooled by the passage of balls. At the output of the last compression stage, the compressed air is stored in a compressed air storage means 4. For the compression mode of operation, the balls circulate from a cold storage drum 5 by means of a pneumatic system (not represented) to a hot storage drum 6 by passing through four radial heat exchangers 3 by means of four circuit branches in parallel.

Figure 6:
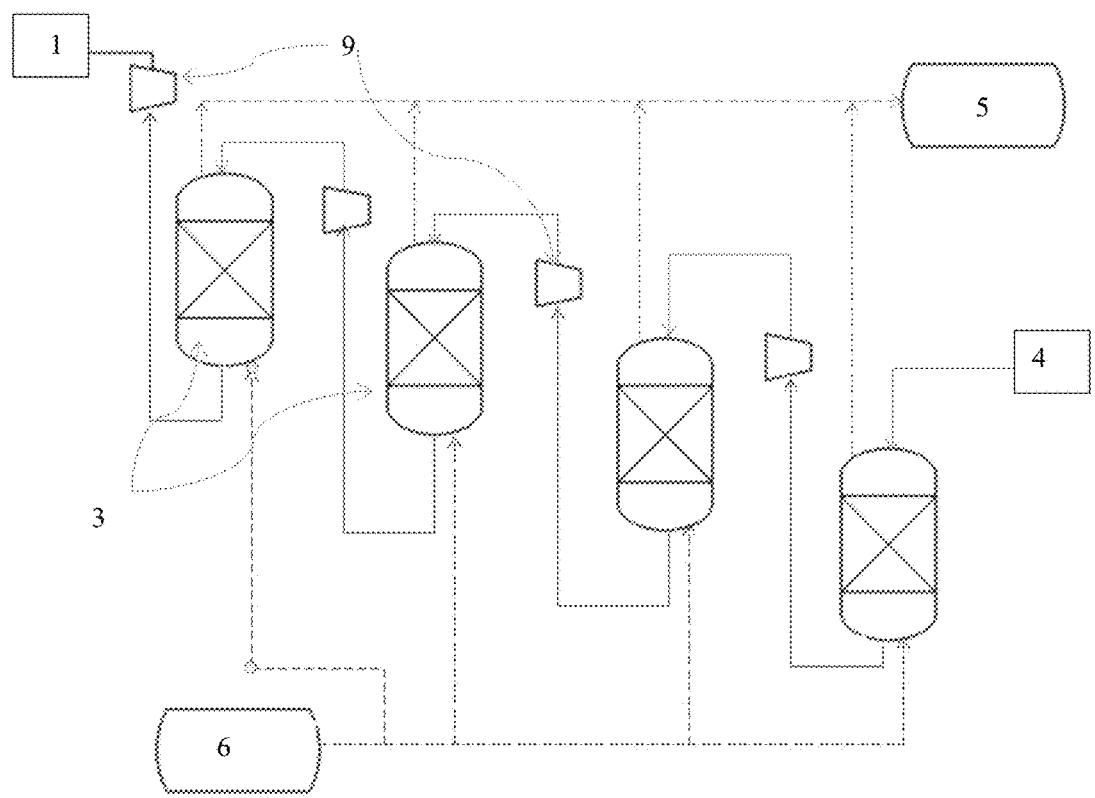
FIG. 6 illustrates the compressed gas energy storage and harvesting system of FIG. 4 in energy storage restoration mode.

FIG. 6 illustrates the embodiment of FIG. 4 in an energy restoration mode of operation, i.e. by air expansion. The AACAES system according to this first embodiment of the invention comprises four expansion stages produced by expansion means 9 which successively expand the compressed air contained in the compressed air storage means. Between each expansion stage, there is a radial heat exchanger, within which the air cooled by the expansion is heated by the balls. At the output of the last expansion stage, the expanded air is released into the ambient environment. For the expansion mode of operation, the balls circulate from the hot storage drum by means of a pneumatic system to the cold storage drum by passing through the four heat exchangers by means of four circuit branches in parallel. The hot storage drum contains the hot balls which have been used to cool the compressed air in the compression.

According to an alternative of this first embodiment that is not represented, the storage means for the balls comprise two storage drums (a hot drum and a cold drum) for each compression or expansion stage. The balls circulate between these two storage drums by passing through a single radial heat exchanger (that of the stage concerned). This embodiment makes it possible to limit the size of the storage drums for the heat transfer fluid, because the volume of heat transfer fluid to be stored is reduced because the heat transfer fluid passes only into a single heat exchanger.

According to a second embodiment of the invention, the exchange of heat between the air and the balls or the heat transfer fluid comprising the balls is indirect: the air exchanges the heat with the balls by means of at least one intermediate fluid, called secondary fluid. The intermediate fluid can be of different kinds: molten salts (for example $NaNO_2$, $NaNO_3$, $KNO_2$, etc.), oil, water according to the temperature and pressure levels of the secondary circuit. Thus, between each compression and/or expansion stage a heat exchanger is inserted between the compressed air and the secondary fluid. The second fluid also exchanges heat with the balls by means of at least one radial exchanger. The storage means for the balls comprise two storage drums for the heat transfer fluid (a hot drum and a cold drum). The balls circulate between these two storage drums by passing through the radial exchanger. This embodiment allows for more flexibility, the regulation of the flow rate on start ups can be performed with the variation of flow rate of the secondary fluid cascaded on the flow rate of balls and also makes it possible to have a low-pressure radial exchanger.

Figure 5:
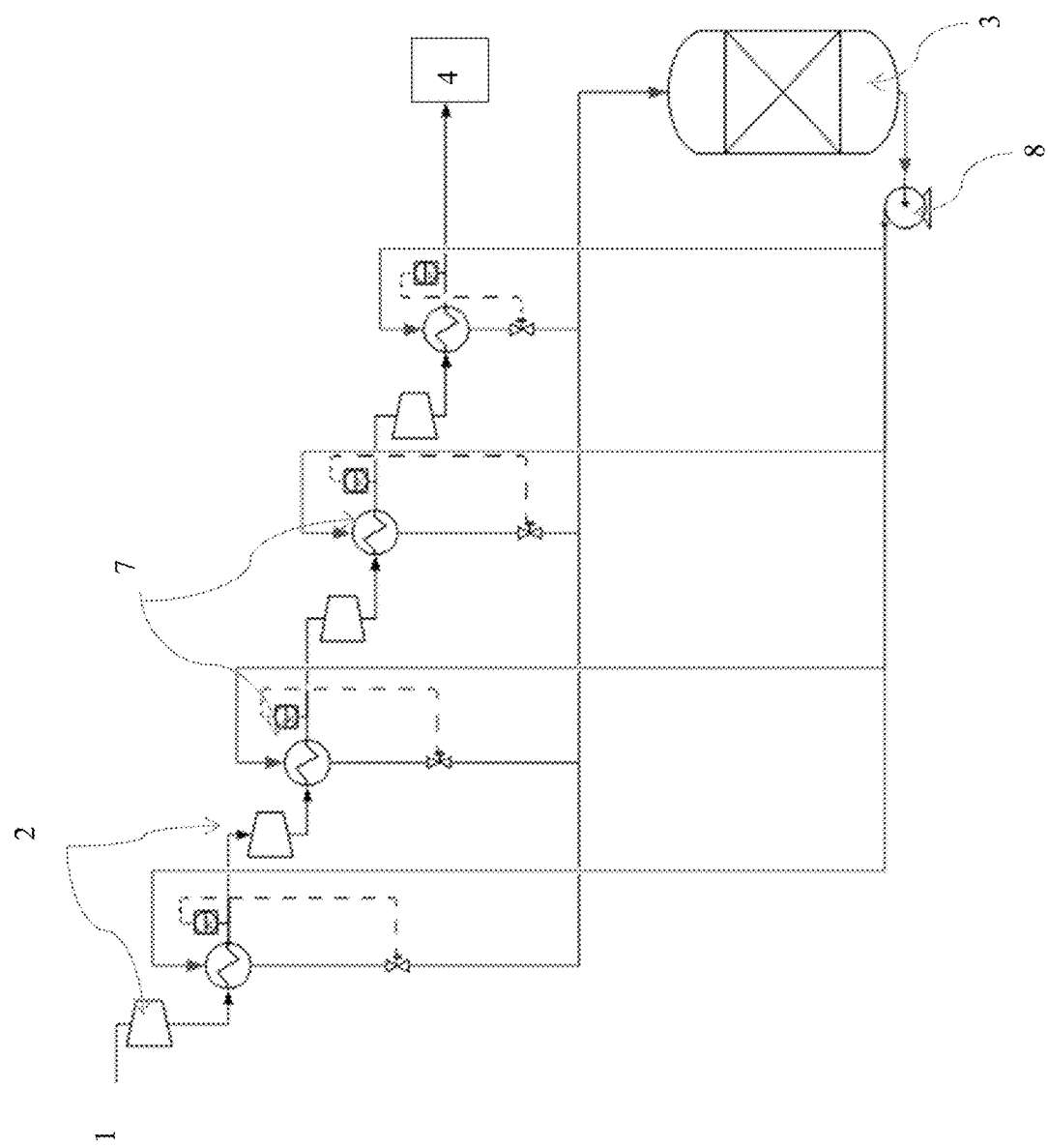
FIG. 5 illustrates a compressed gas energy storage and harvesting system, according to a second embodiment of the invention, in energy storage operating mode.

FIG. 5 presents an AACAES system according to a nonlimiting example of the second embodiment of the invention, for the energy storage mode of operation (i.e. by air compression). As illustrated, the AACAES system according to the invention comprises four compression stages produced by air compressors 2 which successively compress the air taken from the ambient air 1. Between each compression stage there is a heat exchanger 7, within which the air compressed and heated (by the compression) is cooled by the secondary fluid. At the output of the last compression stage, the compressed air is stored in a compressed air storage means 4. The system comprises a closed circuit for circulation of the secondary fluid, this circuit comprises a radial exchanger 3 in order to cool the secondary fluid with the balls. Thus, the secondary fluid circulates in a closed circuit through all the exchangers 7 via parallel branches and in the radial exchanger 3. The circulation of the secondary fluid is implemented by means of a pump 8. Thus, the balls are heated in order to store the heat deriving from the compression of the gas. In this figure, the hot and cold storage drums for the balls are not represented.

For the energy restoration mode of operation, i.e. by air expansion (not represented), the AACAES system according to this second embodiment of the invention comprises four expansion stages produced by expansion means which successively expand the compressed air contained in the compressed air storage means. Between each expansion stage there is a heat exchanger, within which the compressed air is heated by the secondary fluid. At the output of the last expansion stage, the expanded air is released into the ambient environment. The system comprises a closed circuit for circulation of the secondary fluid, this circuit comprises a radial exchanger in order to heat the secondary fluid with the balls. Thus, the secondary fluid circulates in a closed circuit through all the exchangers via parallel branches and in the radial exchanger. The circulation of the secondary fluid is implemented by means of a pump. Thus, the balls restore the heat stored in the hot drum upon the compression.

The use of balls of heat storage material makes it possible to be able to operate with different cycle times, that is to say that the AACAES system can continue to operate even if the air storage cycle time and the air withdrawal cycle time are different. Furthermore, the system according to the invention allows for operational flexibility and simplicity; the regulation is done with the output temperature on the compressed air side, and the system requires a pump, two storage drums and heat exchangers.

The present invention also relates to a compressed gas storage and harvesting method, in which the following steps are carried out:
a) a gas is compressed, notably by means of an air compressor;
b) the compressed gas is cooled by heat exchange with heat storage balls, in particular by means of a heat exchanger;
c) the cooled compressed gas is stored, notably by a compressed gas storage means;
d) the stored compressed gas is heated by heat exchange with the heat storage balls heated in the step b); and
e) the heated compressed gas is expanded to generate an energy, for example by means of a turbine for generating an electrical energy.

According to the invention, the heat storage balls are stored in such a way as to store the heat deriving from the compression. Furthermore, the heat is exchanged between the gas and the heat storage balls by means of at least one radial exchanger, in which a first fluid and the balls are made to circulate in counterflow, the first fluid circulating from bottom to top of the radial exchanger by passing radially through the means for circulating the balls.

The method according to the invention can be implemented by the system according to the invention, in particular the radial exchanger and the heat storage balls can be as described previously.

According to an aspect of the invention, the method comprises several successive compression stages, by means of air compressors placed in series. In this case, the steps a) and b) are reiterated for each compression step.

According to a feature of the invention, the method comprises several successive expansion stages, by expansion means placed in series. In this case, the steps d) and e) are reiterated for each expansion step.

According to the first embodiment of the invention, illustrated in FIG. 4, the balls are made to circulate between two storage drums, the balls being used for all the heat exchange steps with the compressed gas by means of several radial exchangers. The balls are distributed in parallel branches which each comprise at least a single radial exchanger.

According to the second embodiment of the invention, illustrated in FIG. 5, for each heat exchange step, heat is exchanged between the gas and the heat storage balls by means of an intermediate fluid, called secondary fluid. Then, the heat of the secondary fluid is exchanged with the balls by means of a radial exchanger. For this embodiment, the balls are made to circulate between two storage drums, through the radial exchanger. The secondary fluid is distributed in parallel branches which each comprise a heat exchanger with the gas.

The invention claimed is:

1. A compressed gas energy storage and harvesting system, the system comprising:
   at least one gas compression means;
   storage means for the compressed gas;
   at least one expansion means for the compressed gas;
   at least one heat exchange means between the compressed gas and heat storage balls, the at least one heat exchange means being arranged at the output of the at least one gas compression means and/or at the input of the at least one expansion means, the at least one heat exchange means comprising at least one radial exchanger in which a first fluid and the heat storage balls circulate to exchange heat, the first fluid circulating within the at least one radial exchanger by passing radially through means for circulating the heat storage balls comprising an annular space in which the heat storage balls circulate from top to bottom, the at least one radial exchanger being configured such that:
      the first fluid passes radially away from a periphery of the at least one radial exchanger, through the annular space, and toward a center of the at least one radial exchanger, or
      the first fluid passes radially away from the center of the at least one radial exchanger, through the annular space, and toward the periphery of the at least one radial exchanger; and
   storage means for the heat storage balls.

2. The system as claimed in claim 1, wherein the first fluid and the heat storage balls circulate in counterflow in the at least one radial exchanger.

3. The system as claimed in claim 1, wherein the first fluid is the compressed gas.

4. The system as claimed in claim 1, wherein the first fluid is a secondary fluid exchanging heat with the compressed gas.

5. The system as claimed in claim 1, wherein the storage means for the heat storage balls comprises at least a first storage means and a second storage means the heat storage balls circulating from the first storage means to the second storage means through the at least one radial exchanger.

6. The system as claimed in claim 1, wherein the at least one gas compression means comprises several staged gas compression means, the at least one expansion means comprises several staged expansion means, and a heat exchange means of the at least one heat exchange means is arranged between each stage of the at least one gas compression means and/or of said each stage of the at least one expansion means.

7. The system as claimed in claim 1, wherein the at least one heat exchange means comprises several radial exchangers mounted in series and/or in parallel.

8. The system as claimed in claim 1, wherein the heat storage balls are incorporated in a heat transfer fluid.

9. The system as claimed in claim 1, wherein the heat storage balls have a diameter of between 10 nm and 50 mm.

10. The system as claimed in claim 1, wherein the heat storage balls comprise alumina, metal, or micro or nano capsules of phase change material.

11. The system as claimed in claim 1, wherein the heat storage balls withstand temperatures of between 20 and 700° C.

12. A compressed gas energy storage and harvesting method, comprising steps of:
   a) compressing a gas;
   b) cooling the compressed gas by heat exchange with heat storage balls;
   c) storing the cooled compressed gas;
   d) heating the stored compressed gas by heat exchange with the heat storage balls; and
   e) expanding the heated compressed gas to generate an energy,
   wherein the heat storage balls are stored, heat is exchanged between the gas and the heat storage balls by means of at least one radial exchanger in which the heat storage balls and a first fluid are made to circulate, the first fluid circulating within the at least one radial exchanger by passing radially through means for circulating the heat storage balls comprising an annular space in which the heat storage balls circulate from top to bottom, the at least one radial exchanger being configured such that:
      the first fluid passes radially away from a periphery of the at least one radial exchanger, through the annular space, and toward a center of the at least one radial exchanger, or
      the first fluid passes radially away from the center of the at least one radial exchanger, through the annular space, and toward the periphery of the at least one radial exchanger.

13. The method as claimed in claim 12, wherein the heat is exchanged between the gas and the heat storage balls by making the gas circulate in the radial exchanger as the first fluid.

14. The method as claimed in claim 12, wherein the heat is exchanged between the gas and the heat storage balls by exchanging the heat between the gas and a secondary fluid, then by exchanging the heat between the secondary fluid and the heat storage balls by means of the at least one radial exchanger, the secondary fluid being the first fluid.

15. The method as claimed in claim 12, wherein the heat storage balls are made to circulate between two storage means for at least one heat exchange.

16. The method as claimed in claim 12, wherein the heat storage balls are incorporated in a heat transfer fluid.

17. The method as claimed in claim 12, wherein the heat storage balls have a diameter of between 10 nm and 50 mm.

18. The method as claimed in claim 12, wherein the heat storage balls comprise aluminas, metals, or micro or nano capsules of phase change material.

19. The method as claimed in claim 12, wherein the heat storage balls withstand temperatures of between 20 and 700° C.

20. A compressed gas energy storage and harvesting system, the system comprising:
   a turbine for compression and expansion of gas;
   a vessel for storing compressed gas emitted from the turbine;
   a radial exchanger configured to transfer energy between the compressed gas and heat storage balls, the radial exchanger comprising an annular space in which the heat storage balls circulate from top to bottom, the radial exchanger being configured such that:
      a first fluid passes radially away from a periphery of the radial exchanger, through the annular space, and toward a center of the radial exchanger, or the first fluid passes radially away from the center of the radial exchanger, through the annular space, and toward the periphery of the radial exchanger; and
   a vessel for storing the heat transfer balls.

* * * * *